(12) United States Patent
Ardanuc et al.

(10) Patent No.: US 10,027,254 B2
(45) Date of Patent: Jul. 17, 2018

(54) METHOD OF ENERGY HARVESTING USING BUILT-IN POTENTIAL DIFFERENCE OF METAL-TO-METAL JUNCTIONS AND DEVICE THEREOF

(76) Inventors: Mehmet Serhan Ardanuc, Ankara (TR); Ozge Zorlu, Ankara (TR); Haluk Kulah, Ankara (TR); Tayfun Akin, Ankara (TR)

( * ) Notice: Subject to any disclaimer, the term of this patent is extended or adjusted under 35 U.S.C. 154(b) by 1013 days.

(21) Appl. No.: 14/376,149

(22) PCT Filed: Feb. 1, 2012

(86) PCT No.: PCT/TR2012/000024
§ 371 (c)(1),
(2), (4) Date: Aug. 12, 2014

(87) PCT Pub. No.: WO2013/115733
PCT Pub. Date: Aug. 8, 2013

(65) Prior Publication Data
US 2015/0001991 A1 Jan. 1, 2015

(51) Int. Cl.
*H02N 1/00* (2006.01)
*H02N 1/08* (2006.01)

(52) U.S. Cl.
CPC ............... *H02N 1/00* (2013.01); *H02N 1/08* (2013.01)

(58) Field of Classification Search
CPC .............. H02N 1/00; H02N 1/08; H02N 1/09
USPC ....... 310/300–309, 328, 352, 40 MM, 12.12, 310/12.03; 290/1 R
See application file for complete search history.

(56) References Cited

U.S. PATENT DOCUMENTS

| 4,814,657 A * | 3/1989 | Yano | H02N 1/08 310/309 |
| 8,222,754 B1 * | 7/2012 | Soliman | F03G 7/08 290/1 R |
| 2006/0077762 A1 * | 4/2006 | Boland | H02N 1/08 367/170 |

(Continued)

FOREIGN PATENT DOCUMENTS

EP 2072292 A1 * 6/2009 ........... B60C 23/041

OTHER PUBLICATIONS

EIC STIC-2800 Search Report 539870 by Eileen Patton Apr. 17, 2017.*

(Continued)

*Primary Examiner* — Bernard Rojas
*Assistant Examiner* — Maged Almawri
(74) *Attorney, Agent, or Firm* — Gokalp Bayramoglu

(57) ABSTRACT

This invention is related with electrical energy conversion device, which uses built-in potential of metal-to-metal junctions from repeating movements with random frequencies, speeds and amplitudes at the medium of the device. The device using the method does not rely on a resonant frequency, besides, it can convert the kinetic energy to electrical energy even at low frequencies. Furthermore, its application to the real life situations is economic and beneficial because of the efficient working principle and simple structure. Unique design of the device enables direct wiring of the outputs of identical or similar devices together for the purpose of power scaling without the need of using another device, which may cause energy losses and increase the total cost. This device also does not require a dummy voltage source or a precharge at the beginning of energy harvesting.

12 Claims, 9 Drawing Sheets

(56) References Cited

U.S. PATENT DOCUMENTS

Figure 1:
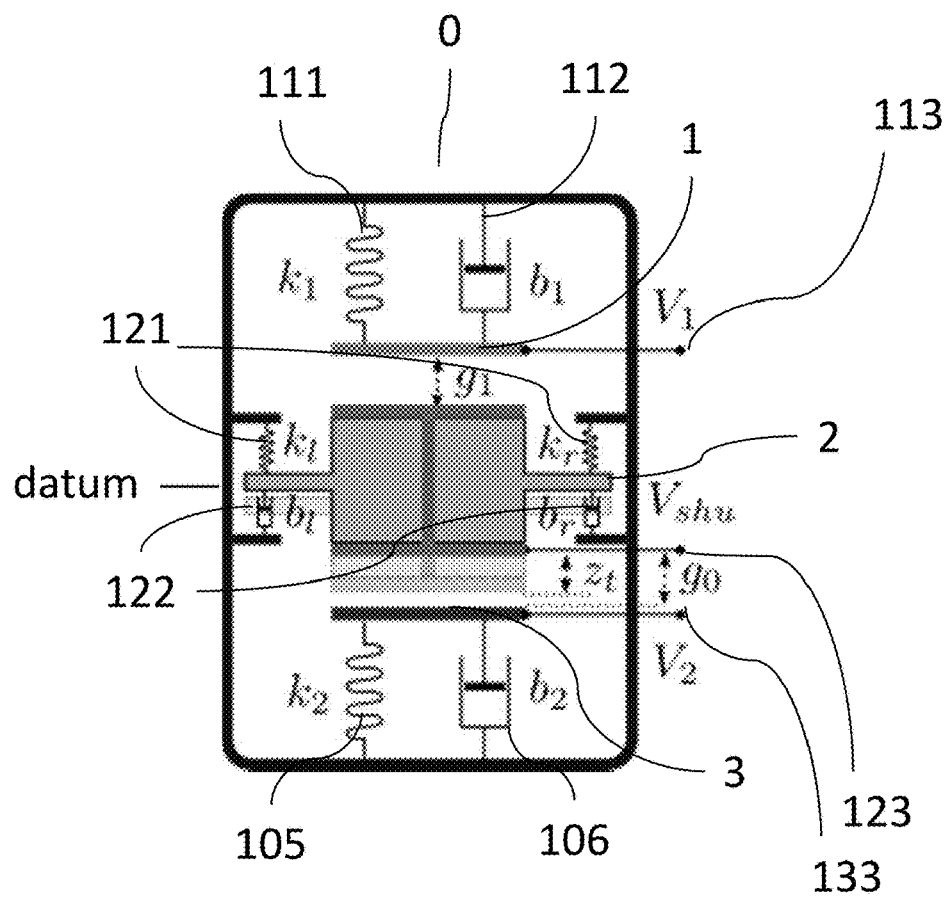

| | | | |
|---|---|---|---|
| 2008/0136292 A1* | 6/2008 | Thiesen | B60C 23/041 310/334 |
| 2010/0164323 A1* | 7/2010 | Hobbs | H02N 1/006 310/300 |
| 2010/0295413 A1 | 11/2010 | Eckstein et al. | |
| 2011/0316384 A1* | 12/2011 | Nakatsuka | H02N 1/08 310/300 |

OTHER PUBLICATIONS

IEEE 2010 Collision based capacitive vibration energy harvesting article by Ling Bu.* ip.com search.*

I. Kuehne, A. Frey, G. Eckstein, U. Schmid, and H. Seidel, "Design and analysis of a capacitive vibration-to-electrical energy converter with built-in voltage," Montreux, Switzerland, 2007, pp. 138-141. [Online]. Available: http://dx.doi.org/10.1109/ESSDER.2006. 307657.

L. Bu, X. Wu, and L. Liu, "Collision based capacitive vibration energy harvesting", 2010, ICSICT-2010—2010 10th IEEE International Conference on Solid-State and Integrated Circuit Technology, Proceedings, art. No. 5667819, pp. 1955-1957.

E. R. Post and K. Waal, "Electrostatic power harvesting for material computing," Personal and Ubiquitous Computing, vol. 15, No. 2, pp. 115-121, 2011.

I. Sari, T. Balkan, and H. Kulah, "An electromagnetic micro power generator for low-frequency environmental vibrations based on the frequency upconversion technique," Journal of Microelectromechanical Systems, vol. 19, No. 1, pp. 14-27, 2010. [Online]. Available: http://dx.doi.org/10.1109/JMEMS.2009. 2037245.

G. Eckstein and I. Kuehne: "Device comprising a capacitive energy converter that is integrated on a substrate," Nov. 2010, US Patent Application Publication No. 2010/0295413. [Online]. Available: http://www.freepatentsonline.com/y2010/0295413.html.

Ingo Kuehne et al:"Design and Analysis of a Capacitive Vibration-To-Electrical Energy Converter with Built-In Voltage", Solid-State Device Research Conference, 2006. ESSDERC ESSDERC 2006. Proceeding of the 36th European, IEEE, PI, Sep. 1, 2006(Sep. 1, 2006), pp. 138-141,XP03104/012, ISBN:978-1-4244-0301-1.

Lin Li et al:"MEMS for vibration energy harvesting", SPIE, PO Box 10 Bellingham WA 98227-0010 USA, vol. 6836,683610,2008, XP040432246.

Einar Halvorsen et al: "Simulation of Electromechanical Systems Driven by Large Random Vibrations", Perspective Techonologies and Methods in MEMS Design,2007. MEMSTECH 2007 International Conference on, IEEE, PI, May 1, 2007(May 1, 2007), pp. 117-122, XP031122889, ISBN:978-966-553-614-7.

\* cited by examiner

METHOD OF ENERGY HARVESTING USING BUILT-IN POTENTIAL DIFFERENCE OF METAL-TO-METAL JUNCTIONS AND DEVICE THEREOF

BACKGROUND OF THE INVENTION

This invention describes a mechanical to electrical energy conversion device, which uses built-in potential of metal-to-metal junctions to generate varying electrical voltages/currents from vibrations or rotations that have random frequencies, speeds, phases and amplitudes within the broad operating range of the device. Furthermore, the operation principle of the invention enables direct wiring of many similar devices, leading to direct increase of the harvested energy without being affected by the differences in the vibration or rotation characteristics as above.

PRIOR ART ABOUT THE INVENTION (PREVIOUS TECHNIQUE)

Generating energy with stand-alone structures is an appealing, topic with many emerging applications such as monitoring devices and mobile equipment with rechargeable battery. Providing energy to devices and making them self-powered without bulky wires carrying electrical power enables portability, covertness, and ease of dispatchability. These aspects are crucial for wireless sensor/actuator node applications, medical implants, portable surveillance tools, and low-power mechatronic applications with rechargeable battery.

Definition of energy harvesting is converting an already existing energy type such as heat, light, vibration, and movement, which are present in the medium, into another energy type, which is usually electrical energy for the applications mentioned above. Energy harvesting is done to overcome the need of charging, changing or even using the batteries which exist in the portable and/or implantable devices or remote monitoring systems. One of the applications that require an energy harvesting module is monitoring of environmental conditions such as temperature, humidity, and vibration using wireless sensor nodes (WSN). Harvesting vibrational energy and converting it into electrical energy to power a WSN is an example application of energy harvesters, which can be enabled by the described invention.

Vibrational energy harvesting is usually implemented with electromagnetic, piezoelectric and capacitive devices. Magnets and coils are used for electromagnetic vibrational energy harvesters. Movement of a magnet and a coil with respect to each other induces a flux change, and a restoring voltage across the coils develops to oppose this flux change. In the presence of an electrical load, this voltage yields a current and hence electrical power.

Piezoelectric devices achieve electromechanical energy conversion with the intrinsic reciprocal conversion aspect of piezoelectric crystals that respond to stress/strain changes with a change in electrical polarization. When these devices are subjected to vibration, a varying voltage is generated across the terminals of the piezoelectric crystals, which can be used to drive an electrical load possibly after basic rectification. Unfortunately, high-quality piezoelectric crystals are often made from expensive materials, which is an important drawback for large area deployment. U.S. Pat. No. 7,687,977 numbered patent publication relates to a micro electro mechanical energy harvester which uses piezoelectric materials.

Another well-known vibration harvester makes use of capacitive devices. Capacitors, whose values change with the movements of one or both of the electrodes, are used for converting mechanical energy into electrical energy. However, these devices need to be pre-charged increasing the design complexity and cost of implementation. Furthermore, very high output impedance of these devices brings a considerable challenge in the design of the rectifying electronics. US 2010/0295413A1 numbered patent publication describes a capacitive energy converter device that is integrated on a substrate and coupled to a moving structure using, magnets without mechanical contact.

Another method of energy conversion employs a piezoelectric or an electroactive polymeric material which is placed between magnetostrictive materials. When exposed to changing magnetic field of a moving magnet, magnetostrictive materials induce a stress/strain in the piezoelectric material that in turn generates electrical energy. Although this method shows similarity with electromagnetic techniques, elimination of coils can be considered as an advantage. U.S. Pat. No. 6,984,902 numbered patent application relates to an energy harvesting method which is based on converting mechanical energy of magnetostrictive materials into electrical power.

Another claimed method for harvesting vibrational energy involves using capacitive type harvesters and relies on variable capacitor electrodes which are made of different materials[1] (Kuehne, I; Frey, A.; Marinkovic. D. Eckstein, G. Seidel, H.; 2007). It is claimed in this paper that using contact potential difference of the electrodes eliminates the need for an external voltage supply which is commonly used in capacitive harvesters. Movement of the plates causes a change in charge or voltage, which results in energy production. Although this device is shown to work in theory and simulation, no experimental results are presented in the cited paper. This device is vibrated at high frequencies (1 KHz) in the presented simulation. As such, common requirements of vibration to electrical energy conversion in real life situations, which often demands response to broadband and low frequency (<100 Hz) vibrations, are not addressed. Furthermore, the device mentioned by Kuehne et al. may not be able to achieve power scaling by direct wiring (ie. parallel connection) of similar devices, since asynchronous vibration of different devices connected in parallel can cause cancellation of the outputs of the individual devices.

A different principle of energy harvesting is to produce electrical energy by using the collisions which occur as a result of environmental vibrations[2] (Bu L., Wu X., Liu L. 2010). This operation principle can theoretically work at both low and high frequencies, since both collision and contact are non-linear processes that can yield broad-band operation.

Wearable energy harvester is a recent application of vibration to energy converter devices. One example[3] (Post E. R and Waal K.) uses the principle of triboelectricity to produce electrical energy from the contact and rubbing based charging of different materials.

A nanoscale charge transfer device is described in US 20100264998 A1 patent application, where the charge transfer occurs in response to the acoustic oscillations of the substrate in the presence of an applied bias voltage.

Although there are lots of energy harvesting methods and devices, it is hard to find a device that fulfills the requirements targeted by this invention such as power scaling by direct wiring, broadband operation, low-cost, easy installation over large areas. If the available energy harvesters cannot cope with the energy requirement, three approaches can be suggested to solve the problem. One of the solutions is doing research and development for design of a new and improved version of the already existing device and its production. Because of the fact that research and development is a very expensive and time consuming procedure, this solution is hard to apply in every situation. Another possible solution is to do a detailed market search for an energy harvesting device that meets the required specifications of power and device volume. However, it is possible that such a device has a very high cost or is at all not available in the market, if the specifications being sought are pushing the limits of the state-of-the art. The third solution to achieve the power and performance need is to merge the outputs of a number of energy harvesters. In theory, it may be possible to connect the outputs of identical devices for some energy harvester types but due to the production imperfections (since perfectly identical products cannot be produced in practice), this approach does not yield the desired performance. In other words, phase and amplitude response of the electrical output of the devices cannot be exactly the same for two different harvesters even though they are exposed to exactly the same vibration characteristics. Challenges towards direct wiring of electromagnetic harvesters are mentioned in a paper on a micro scale device using mechanical frequency-up-conversion of vibrational energy harvesting[4] (Sari, I. Balkan, T., Kulah, H; 2010). The outputs of some types of capacitive vibration harvesters can be wired through integrated switches, but this kind of harvesters cannot be operated without a dummy voltage source.

AIMS FOR THE DEVELOPMENT OF THE INVENTION

The main premise of this invention is to provide a method of energy harvesting using built-in potential difference of metal-to-metal junctions and an apparatus thereof for large-bandwidth mechanical energy to electrical energy conversion while supporting direct wiring of multiple devices enabling the scaling of the final electrical power output with the number of devices.

The advantages of the invention over the current technology can be summarized as follows:

Manufacturing costs of the device are lower.

Simple structure of the harvester gives the opportunity for easier maintenance.

Outputs of the harvesters can be scaled with direct wiring in order to achieve the desired energy level without the need for different types of components or devices in between.

Energy production can be done in wider range of frequencies. Scaling can be done for different operation frequencies (i.e. all wired devices can work at different vibration frequencies).

Elastic design of the harvesters gives the opportunity to adjust the devices for large range of motion characteristics.

Device can be applied to different motion types for example to rotational motion or linear vibration.

Energy harvester related with this invention eliminates the need for dummy energy source or a startup pie-charging.

DESCRIPTIONS OF FIGURES

The names of the drawings presented for better understanding of the method of energy harvesting using built-in potential difference of metal-to-metal junctions and apparatus thereof are listed as follows:

FIG. 1. Principal layout of the charge shuttle device

Figure 2:
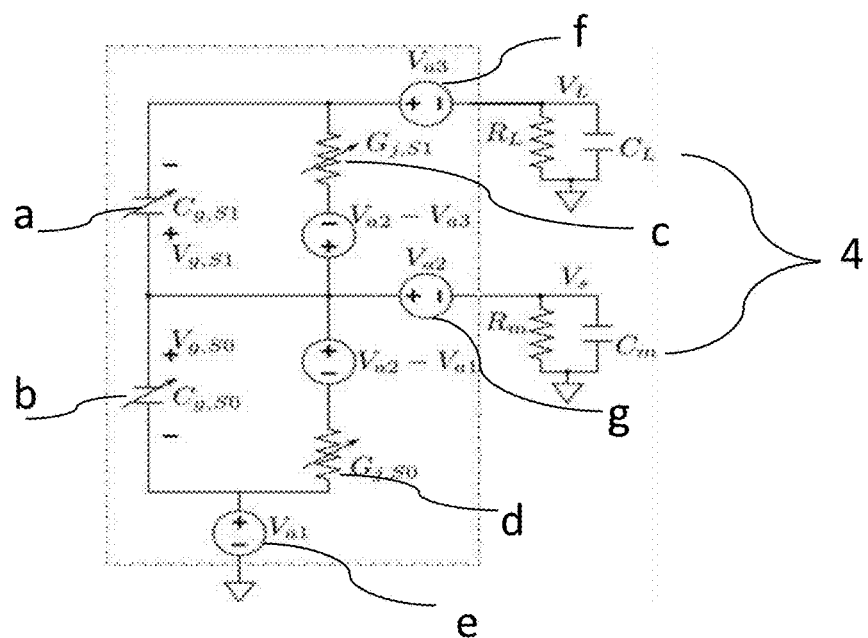

FIG. 2. Electromechanical equivalent circuit of the charge shuttle device

Figure 3:
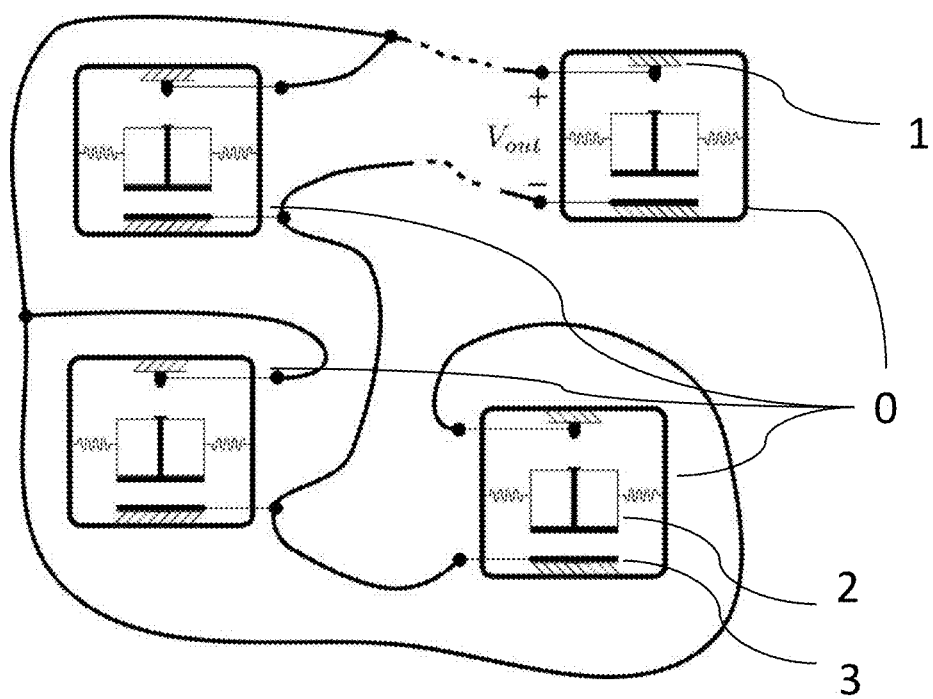

FIG. 3. Direct wiring of the outputs of the charge shuttle devices

Figure 4:
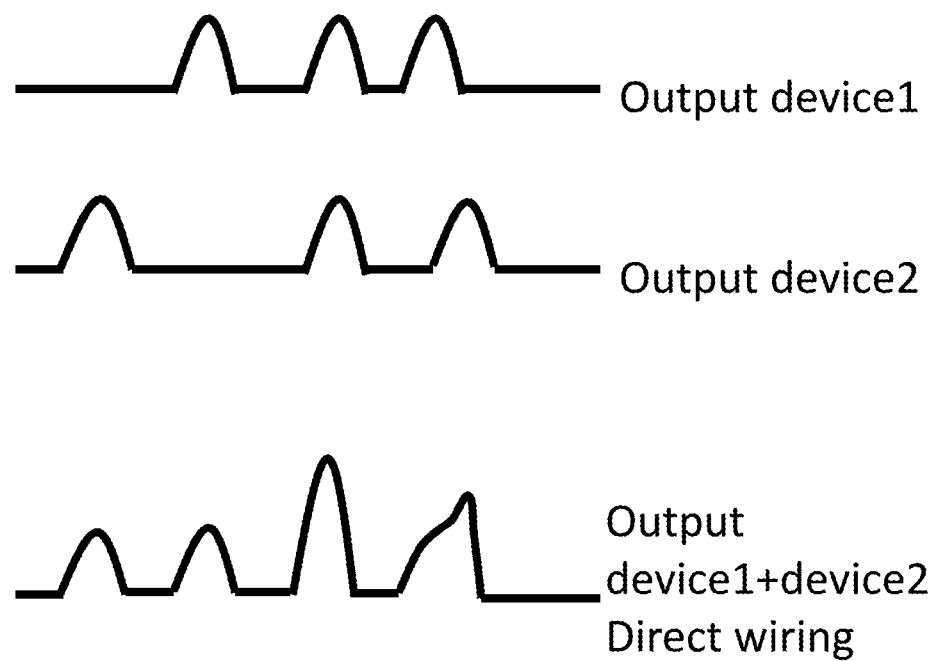

FIG. 4. Illustration of transient waveforms at the output of two CSDs before and after direct wiring FIG. 5. A symbolic view of a special case of the invention, which has a point-like first electrode made of the same material as the shuttle electrodes FIG. 6. Principal layout of a special case of the invention, which has a point-like first electrode made of the same material as the shuttle electrodes FIG. 7. Root-mean-square power versus vibration frequency characteristic of a charge shuttle device that has a point-like first electrode made of the same material as the shuttle electrodes.

Figure 8:
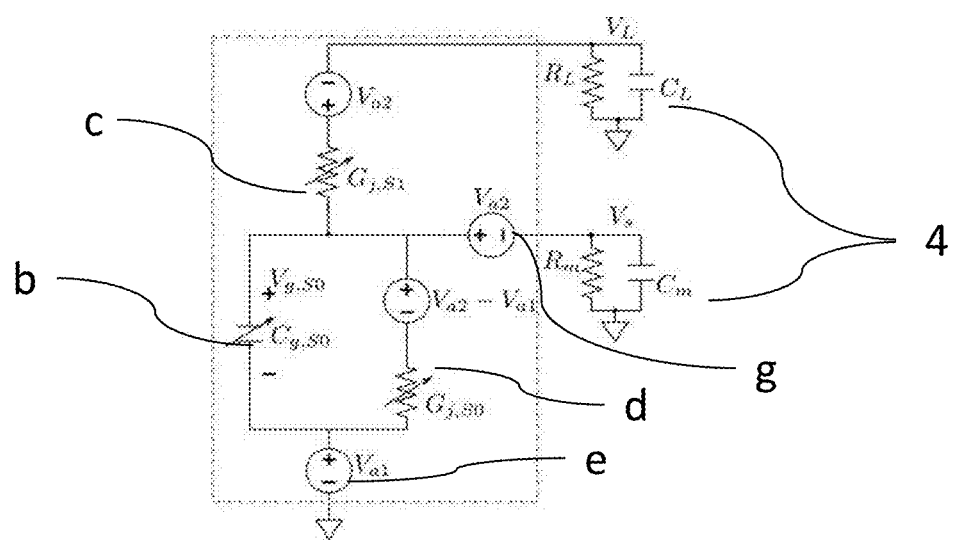

FIG. 8. Electromechanical equivalent circuit of the special case, which has a point-like first electrode made of the same material as the shuttle electrodes FIG. 9. Simplified view of free-to-move charge shuttle device FIG. 10. Preferred geometry of the free-to-move charge shuttle device FIG. 11. Charge shuttle device with multiple free-to-move shuttles that are separated by insulating spacers FIG. 12. Root-mean-square power versus vibration frequency characteristic of a charge shuttle device with multiple free to move shuttles FIG. 13. Charge shuttle device with multiple rotating shuttles to convert rotational motion into electrical energy using the main principles of the invention The numerals referred to in the following description correspond to the following, 0. Charge shuttle device (CSD)
1. Device first electrode (DFE)
111. Spring coefficient of the device first electrode
112. Viscous damper coefficient of the device first electrode
113. Device first electrode node (DEEM
2. Shuttle
121. Spring coefficient of the shuttle
122. Viscous damper coefficient of the shuttle
123. Device shuttle node (DSN)
3. Device second electrode (DSE)
131. Spring coefficient of the device second electrode
132. Viscous damper coefficient of the device second electrode
133. Device second electrode node (DSEN)
4. Electrical load modeled as a parallel connected resistor and capacitor
5. Insulator
a. Capacitance between the shuttle and the device first electrode
b. Capacitance between the shuttle and the device second electrode
c. Varying resistance between the device first electrode and the shuttle
d. Varying resistance between the device second electrode and the shuttle
e. Contact potential of the device second electrode
f. Contact potential of the device first electrode
g. Contact potential of the shuttle

DETAILED DESCRIPTION OF THE INVENTION

According to the present invention shown in FIG. 1, the charge Shuttle device (CSD) (0), which is used for kinetic to electrical energy conversion, consists of:

a. One or more moving shuttles (2) and device shuttle nodes (DSN) (123) to transmit and redistribute the charge to the connected load circuit (4).

b. A device first electrode (DFE) (1), on which the amount of electrical charge is affected by the movements of the shuttle (2) in arbitrary directions and amplitude or by the contact of the shuttle (2) and device first electrode node (DFEN) (113) to transmit and redistribute the charge to the circuit, c. A device second electrode (DSE) which the amount of electrical charge is affected by the movements of shuttle (2) in arbitrary directions and amplitude or by the contact of the shuttle (2) and device second electrode node (DSEN) (133) to transmit and redistribute the charge to the circuit.

The principle of operation of the charge shuttle device (0) is the charging of the surfaces upon contact of the two materials as well as the contact potential difference-based capacitive charging of the two materials which are in close proximity to each other.

One mode of energy conversion of the charge shuttle device (0) involves charging of the DFE (1), DSE (3), and the shuttle(s) (2) through ohmic contact or tunneling due to difference in the contact potentials of the same. If the shuttle (2) moves, due to the periodic or non-periodic movements CSD (0) is exposed to, a distance large enough to touch one of the electrodes (1, 3) for ohmic conduction or become close enough to the electrodes (1, 3) for tunneling, the charge on shuttle (2) and the touched electrode (DFE (1) or (DSE) (3)) gets redistributed based on their contact potentials and their instantaneous voltage changing their net charge. Then the charged shuttle (2) starts to move away from the surface of the touched electrode (DFE (1) or DSE (3)) to the other one (DFE (1) or (DSE) (3)) both in response to bouncing and ongoing vibration. Once the shuttle reaches to the other electrode (DFE (1) or (DSE) (3)), conduction or tunneling occurs and part of the charges carried from the first touched electrode again redistributes on the second touched electrode and the shuttle based on the values of their instantaneous voltages and contact potential differences. The reoccurring cycles of the shuttle back and forth between the electrodes, both periodic or non-periodic, yields AC waveforms at the outputs of the charge shuttle device (0), which can be used for electrical energy utilization.

If the amplitude of motion is not enough to cause a contact between one of the electrodes (DFE (I) or DSE (3)) and the shuttle (2), CSD (0) can still generate electrical energy from the movement as there are always charge redistributions due to varying gaps and their associated variable capacitances that are self-biased by the contact potential differences of the electrodes. Two gaps are formed upon the placement of the shuttle (2) within the DSE (3) and the DFE (1). The gap between the shuttle (2) and DSE (3) is labeled as $g_0$, while the gap between the shuttle (2) and DFE (1) is labeled as $g_1$. If the amplitude of the motion of the shuttle (2) is not large enough, redistribution of the charges within the electrically connected electrodes can still occur. The upper part of the shuttle (2) and the DFE (1) acts like a variable air-gap capacitor ($aXC_{g,s1}$), while the lower part of the shuttle (2) and the DSE (3) acts like another variable air-gap capacitors (b) ($C_{g,s0}$). The changing of the gap between these elements causes redistribution of the charges at the electrodes (1,3) and produce AC waveforms across the terminals of the load resistor and capacitor (4) for electrical utilization.

FIG. 2 shows a simple representation 4 the electromechanical equivalent circuit of the CSD (0), where $V_{bot}$ is taken to be the reference potential and assumed to be zero. Variable resistance between device first electrode and shuttle (c) and varying resistance between device second electrode and shuttle (d) model the resistance between shuttle (2) and the electrodes (1,3) Which change depending on the position of the shuttle with respect to the electrodes (1,3). The contact potential of the device second electrode (e), the contact potential of the device first electrode (f), and the contact potential of the shuttle (g), which are used to model the flow of charge within the electromechanical equivalent circuit of CSD (0), are also shown in FIG. 2. Electromechanical energy conversion occurs through redistribution of the charges as mentioned above, and Alternating Current (AC) waveforms appear between any two of the device first electrode node (DFEN) (113), device shuttle node (DSN) (123), and device second electrode node (DSEN) (133) to be used as a source of electrical power for the target application. DSN (123) can be exempted from the circuit for the design purposes, since electrical connection to this electrode may be challenging in real-life applications. Discarding of the DSN (123) does not cause any difference in the working principle of the invention.

Both the shuttle (2) and the two electrodes (1,3), which form the basis of the invention, are modeled with the spring-mass-damper system in FIG. 1 for the sake of generality. In practice, the DFE (1) and DSE (3) may be put on elastic cushions to enable the deformation/motion of the electrodes while the CSD (0) vibrates. In this case, the spring coefficient of the device first electrode (111), viscous damper coefficient of the device first electrode (112), spring coefficient of the device second electrode (105) and viscous damper coefficient of the device second electrode (106) should have non-zero values. If the DFE (1) and DSE (3) are required not to move with respect to the capsulation of the CSD (0), values of the above mentioned coefficients (111, 105) go to infinity as the electrodes (1,3) are assumed to be rigid and static.

The movement of the shuttle (2) can be modeled with the coefficients of the equations of motion. If the amplitude, speed or acceleration of the movement of the shuttle (2) is desired to be restricted or regulated, dampers should be applied to the system. The motion of the shuttle (2) can be modeled using the spring coefficient (121) and viscous damper coefficient of the shuttle (122). If the shuttle (2) is desired to move freely in the space, then the limits of the values of the coefficients (121, 122) approach to zero, although complete vanishing of these terms are not possible in practice.

If many CSDs (0) are deployed over large areas in an unconnected and independent manner, each of them generates electricity driven by the vibration amplitude, frequency, phase, direction of their respective position. While thus provides electrical power from output of each device, it is often necessary to merge the outputs of all these devices to a single output. Direct wiring (parallel connection) of multiple CSDs (0) as shown in FIG. 3 can be used to merge the outputs of multiple CSDs (0), whose Shuttle (2), DSE (3), DFE (1) are designed and manufactured for power merging. Here, DFENs (113) and DSENs (133) of CSDs are wired together among different CSDs to yield a single global DSEN and a single global DFEN, across which scaled electrical output power is available. The transient waveforms that would occur at the output of two CSDs (0) before and after direct wiring are qualitatively illustrated in FIG. 4, which is not drawn to scale. Due to increase in the output capacitance seen by individual CSDs (0), output amplitude of the merged system after direct wiring is not equal to the addition of outputs before direct wiring. However, shapes of the waveforms are similar to what would happen in the case of addition of two waveforms in time domain.

Output nodes of a large number of charge shuttle devices can be connected in parallel and can be used as a single energy conversion device without the requirement of additional devices for parallel connection. This parallel connection, in one operation mode, results in direct addition of the outputs of each device in time domain, hence there is absolutely zero risk of the waveforms of different devices average or cancel out each other due to frequency and phase differences.

Figure 5:
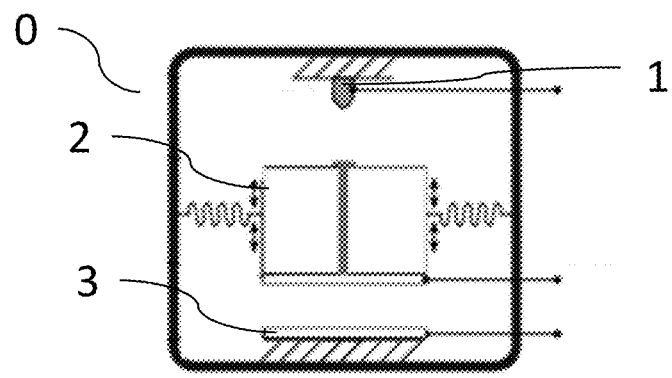
Figure 6:
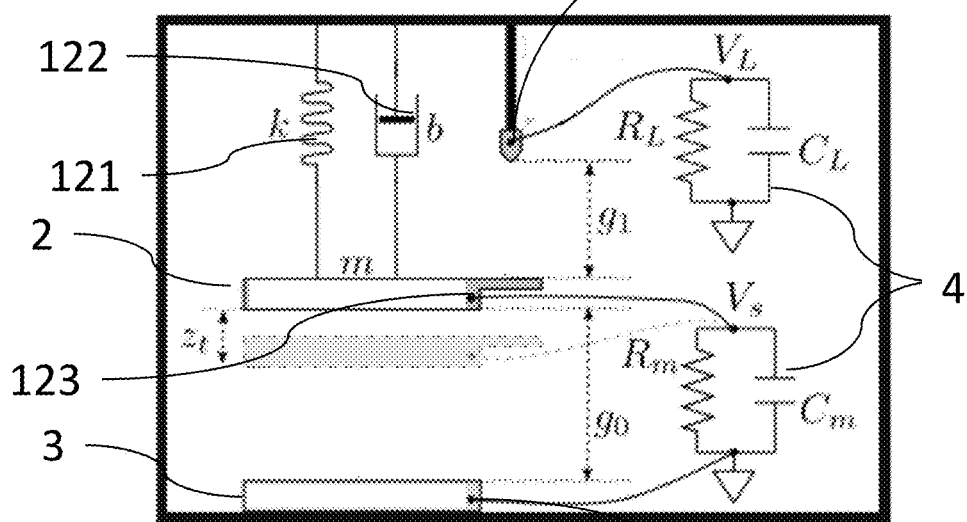

The symbol and the schematic of the experimental prototype of a special configuration of the invention are given in FIG. 5 and FIG. 6, respectively. In this configuration, the CSD (0) works as a mechanical motion harvester. Vibrations of the medium is the kinetic energy source in this application, for which DSE (3) and DFE (1) are chosen to be rigid and spring coefficients of the shuttle (121) and viscous damper coefficients of the shuttle (123) are assumed to have non-zero values. The embodiment illustrated in FIG. 6 has a point-like first electrode made of the same material as the shuttle electrodes.

Figure 7:
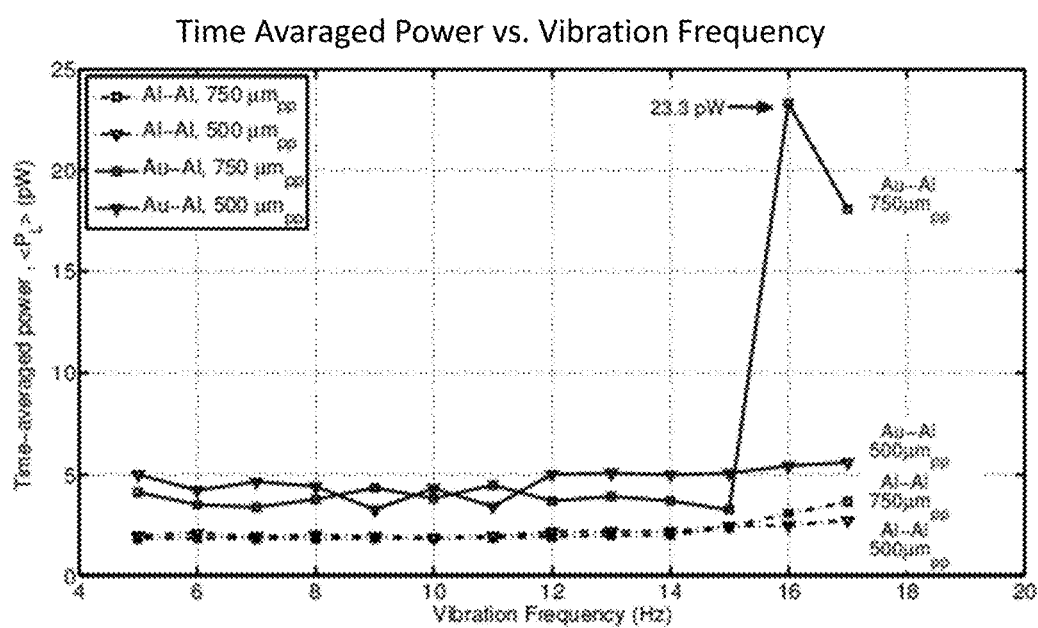

Experimental measurement results showing the effect of the frequency of the vibration on the converted electrical RMS power are shown in FIG. 7 for this special case. Here, four characteristics from two different devices at two different vibration amplitudes are plotted. The device whose shuttle (2), DSE (3) and DFE (1) are all made of the same material does not yield significant electrical output at two different vibration amplitude. However, the device whose first and second electrode are made of different materials yields a significant output for the proper choice of vibration amplitudes and frequencies. This shows the key role of contact potential for the operation of the invention as expected from the described aspects of the device.

FIG. 8 illustrates the electromechanical equivalent circuit used for the above special case of CSD, which has a point-like first electrode made of the same material as the shuttle electrodes. Likewise for the general case of FIG. 1, if the shuttle moves between the DSE (3) and DFE (1) without mechanically touching any of the electrodes (3,1) or through touching only one of the electrodes (3,1), AC waveforms can still develop across any of the two electrical nodes among the device first electrode node (DFEN) (113), the device shuttle node (DSN) (123), and the device second electrode node (DSEN) (133).

Figure 9:
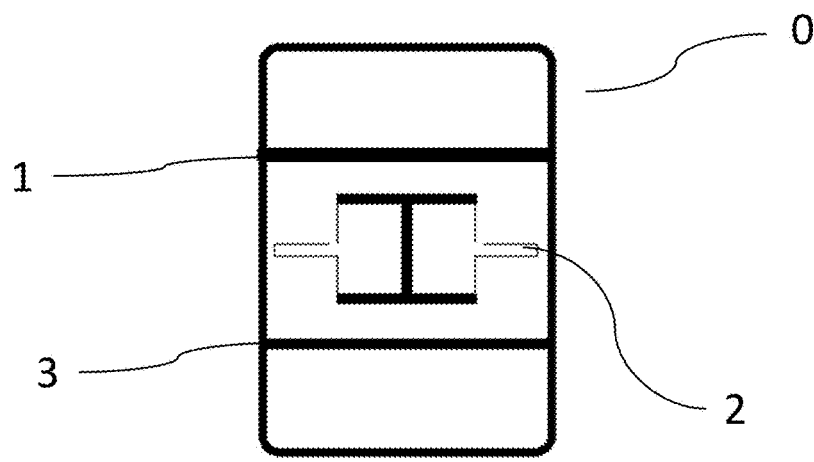

Another configuration of the invention is given in FIG. 9, where DFE (1) and DSE (3) are chosen to be rigid, and the shuttle (2) is allowed to move freely. The same holds for the CSD layout in FIG. 10, in which the shuttle is a conducting sphere. For both of these configurations, the spring coefficients (121) and the viscous damper coefficients (122) of the shuttle can be assumed to be zero (or significantly small so that they can be neglected). In this configuration, DSN (123) is exempted from the circuit for the sake of the simplicity and reliability measures. However, the operating principle of the CSD (0) is the same as that of the basic layouts shown in FIG. 1. If the amplitudes of the vibrations are not large enough to make the shuttle (2) mechanically contact DSE (3) or DFE (1), previously mentioned variable air-gap capacitors yields electromechanical energy conversion with the movement of the shuttle. If the vibrations are large enough for the shuttle (2) to touch one of the DFE (1) or DSE (3), the same electrical charge transfer with the above mentioned phenomena takes place. AC waveforms can then be observed across the DFEN (113) and DSEN (133) with successive strokes of the shuttle.

Figure 10:
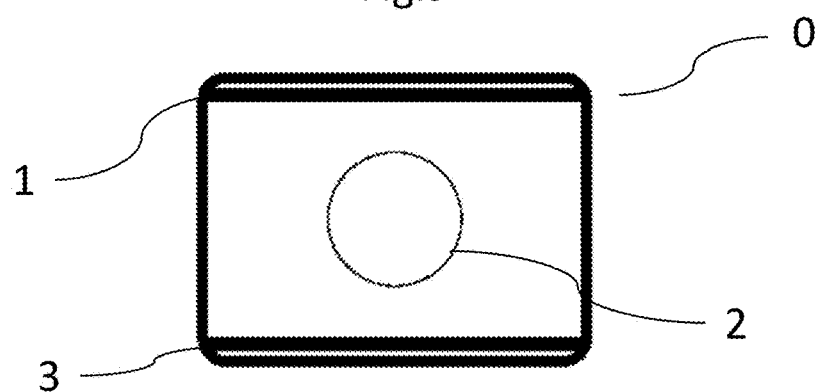
Figure 11:
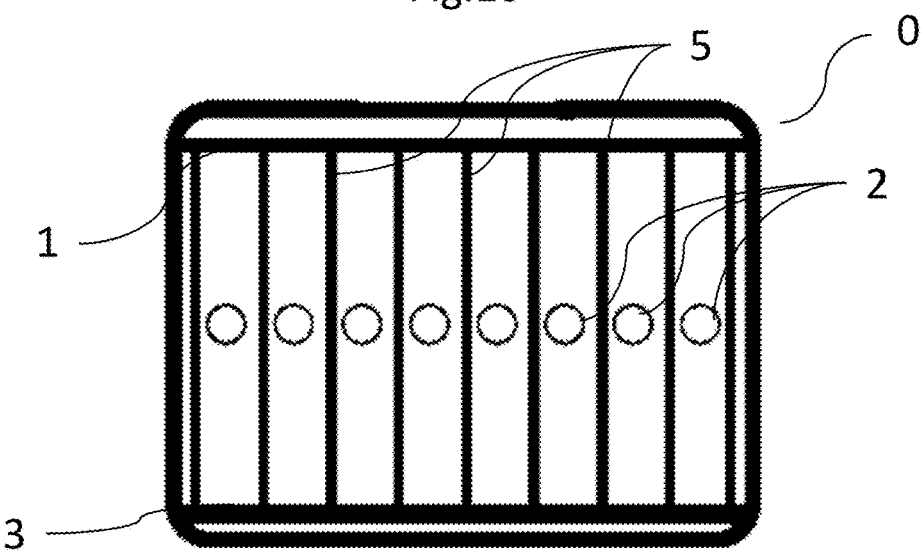

The configuration in FIG. 10 is advantageous for micro scale applications, since no mechanical support or spring structures are required to place the shuttle(s) in the device. Furthermore, since micro fabrication technologies enable fabrication of very small structures in large quantities (batch fabrication), the mentioned CSD (0) configuration can easily be fabricated with a large number of shuttles.

Figure 12:
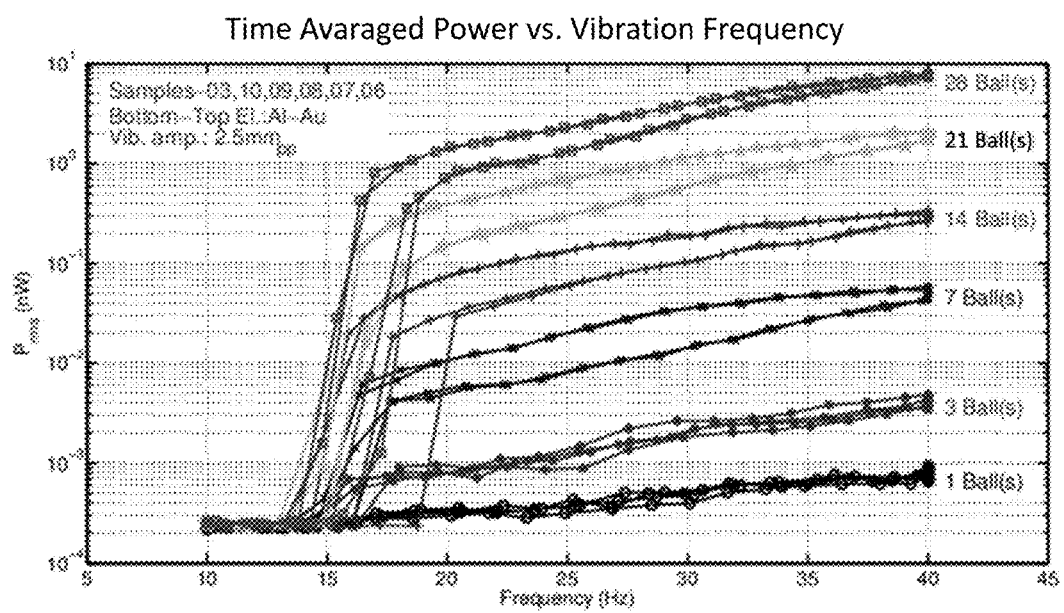

Batch fabrication allows easy direct wiring of the outputs of many CSDs in order to increase the generated output power. A special configuration illustrating this case is presented in FIG. 11, where massive and single piece DFE (1) and DSE (3) can be equipped with multiple shuttles (2). Although it looks different from the direct wiring of the CSDs (0) shown in FIG. 3, operating principle of the device is exactly the same. Insulators (5) prevent colliding of the shuttles (2) with each other. FIG. 12 shows the time averaged power obtained from a prototype of such a special case of CSD (0) for different number of shuttle structures inside the devices as a function of increasing and decreasing frequency. The increase in the output power with increasing number of shuttles is expected based on direct wiring of multiple CSDs.

Direct wiring of the CSDs (0) is important for the development of power converters with micro-scale structures. If the electrical power needed for an application is larger than the energy provided by a single energy harvester, then the ability to merge the outputs directly can be important to reach the demanded power. CSD (0) of the present invention gives the ability to combine the outputs of a multiple number of energy harvesting units without any additional component which might introduce energy losses, increase the costs and the volume of the device. Three node structure of the CSD (0), which consists of DFEN (113), DSN (123) and DSEN (133), avoids any electrical shorting between the common output nodes (113,133). This aspect makes the power expansion of CSDs (0) possible through direct wiring of all DFEN (113) of different CSDs (0) as one global DFEN, and direct wiring of all DSEN (133) as one global DSEN. In this case, global DFEN and DSEN nodes serve as the output of the power-scaled CSD (0) device. In other words, outputs of multiple CSDs (0) can be connected in parallel to increase the electrical power. The direct wiring, which is illustrated in FIG. 3, is possible with the intrinsic three node structure of the CSD (0) and its design principle that shuttle (2) cannot touch both the first and second electrode simultaneously.

Figure 13:
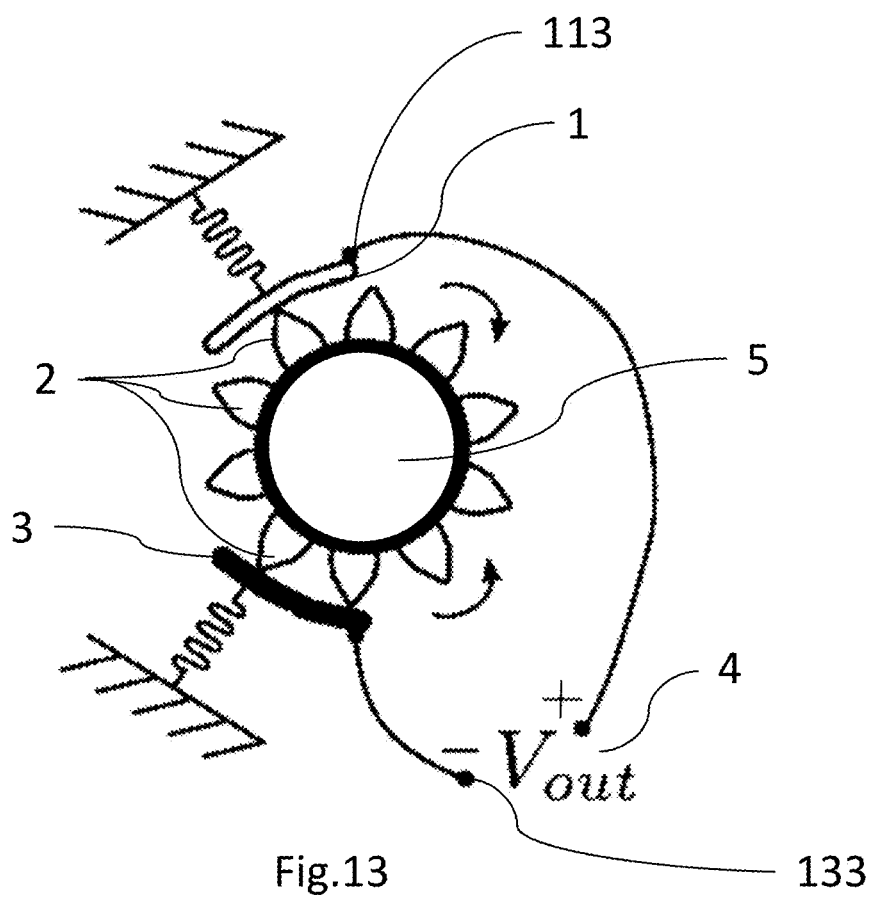

Another configuration of the invention, which is useful when the kinetic energy source of the CSD (0) stems from the rotational motion of another structure on which the CSD (0) is installed, is shown schematically in FIG. 13. Here, the shuttles (2) move rotationally in order to make contact with the electrodes (1,3), through which they carry and redistribute charge across DFE (1) and DSE (3) to convert rotational kinetic energy into electrical energy. In order for this set up to work properly, one or more shuttles (2) are attached to an insulator (5). This insulator structure (s) works as a central shaft that ensures ordered contact of shuttles (2) with DFE (1) and DSE (3) for both clockwise and counter-clockwise rotations. Insulator (5) does not permit the charge transfer between the shuttles. The above mentioned modes of energy conversion of the present invention can be observed for this rotational energy harvesting embodiment of the CSD.

The invention claimed is:
1. A cluster of energy conversion devices comprising:
a plurality of energy conversion devices, wherein each energy conversion device comprises a capsulation, which is fixed within a reference frame of the device, but is subject to an external motion and encapsulates all device components, a device first electrode and a device second electrode, wherein the device first electrode is mechanically coupled to the capsulation, wherein the device second electrode is mechanically coupled to the capsulation, a moving charge shuttle that moves back and forth between the device first electrode and the device second electrode, wherein an external motion of the capsulation results in relative motion of the moving charge shuttle with respect to device first and second electrodes in a way that the moving charge shuttle cannot be in electrical contact with the device first electrode and the device second electrode at the same time, a device first electrode node connected to the device first electrode, a device second electrode node connected to the device second electrode, and a device moving charge shuttle node connected to a moving charge shuttle electrode;

wherein a converted electrical energy is available from generated voltage differentials across the device first electrode, the device second electrode, and the device charge shuttle node due to the relative motion of the moving charge shuttle with respect to the device first electrode and the device second electrode, as a result of contact or proximity based charging of the moving charge shuttle and device first and second electrodes driven by built-in potential differences of metal-to-metal junctions making up the moving charge shuttle and the device first electrode and the device second electrode, wherein a kinetic energy to electrical energy conversion method which uses the built-in potential differences of metal-to-metal junctions associated with the device first electrode, the device second electrode and the moving charge shuttle electrode, wherein the moving charge shuttle is capable of moving freely between the device first electrode and the device second electrode, or motion of the moving charge shuttle may be restrained by a mechanical coupling of the moving charge shuttle to the capsulation, wherein at least two of the device first electrode, the device second electrode and the moving charge shuttle are made of materials with different contact potentials, and wherein the moving charge shuttle moves either partially along a path between the device first electrode and the device second electrode, or the moving charge shuttle moves along a complete path between the device first electrode and the device second electrode, wherein the partial or complete path can be linear, circular, along an arc, or random;

wherein the energy conversion devices are connected in parallel such that the device first electrode node of each energy conversion device is connected to the device first electrode node of the next energy conversion device; and the device second electrode node of each energy conversion device is connected to the device second electrode node of a next energy conversion device;

wherein, the cluster of energy conversion devices further comprises a single, global device first electrode node and a single global device second electrode node associated with the parallel connected device first electrode nodes and the device second electrode nodes, respectively; and a multiple number of device shuttle nodes, associated with the moving charge shuttle electrode of each energy conversion device.

2. The cluster of energy conversion devices of claim 1, wherein the parallel connection of individual devices allows larger power extraction at a single electrical terminal from multiple moving charge shuttle devices distributed over a large area over locations that have different vibration amplitude, phase, frequency, and spectra.

3. The cluster of energy conversion devices according claim 1, wherein the moving charge shuttle can be constrained to make the motion in a predetermined or an undetermined path for transferring charge between the device first electrode and the device second electrode.

4. The cluster of energy conversion devices according claim 1, wherein the moving charge shuttle can be constrained with springs and dampers to restrict the motion of the moving charge shuttle or move freely without any constraints.

5. The cluster of energy conversion devices according claim 1, where vibrational movements are used as the kinetic energy sources by the moving charge shuttle.

6. The cluster of energy conversion devices according claim 1, wherein rotational movements are used as the kinetic energy sources by the moving charge shuttle device.

7. The cluster of energy conversion devices according claim 1, wherein movements of the moving charge shuttle can be periodic, aperiodic, random, or deterministic.

8. The cluster of energy conversion devices according claim 1, wherein work function of materials of the device first electrode, the device second electrode and the moving charge shuttle can be chosen so that the moving charge shuttle can carry a charge.

9. The cluster of energy conversion devices according claim 1, wherein the device first electrode, the device second electrode and the moving charge shuttle act as electrodes of a variable air-gap capacitor, and movement of the moving charge shuttle leads to AC waveforms at terminals of the device first electrode node, the device second electrode node and the device moving charge shuttle node.

10. The cluster of energy conversion devices according claim 1, wherein the each energy conversion device further comprises one or more moving charge shuttles, which cannot be mechanically in contact with both the device first electrode and the device second electrode at the same time, hence preventing an electrical short circuit between the device first electrode and the device second electrode.

11. The cluster of energy conversion devices according claim 1, wherein the device first electrode and the device second electrode can be fixed to a datum as a result of a special case of a coupling the device first electrode and the device second electrode to the datum by spring and damper elements.

12. The cluster of energy conversion devices according claim 1, wherein the device first electrode node and the device second electrode node and the device moving charge shuttle node are accessible as electrical terminals, for connection of electrical loads for electrical energy harvesting.

* * * * *